US009757711B2

(12) United States Patent
Ohtake et al.

(10) Patent No.: US 9,757,711 B2
(45) Date of Patent: Sep. 12, 2017

(54) COMPLEX OXIDE, METHOD FOR PRODUCING SAME, AND EXHAUST GAS PURIFYING CATALYST

(71) Applicant: SOLVAY SPECIAL CHEM JAPAN, LTD., Tokushima (JP)

(72) Inventors: Naotaka Ohtake, Anan (JP); Kazuhiko Yokota, Pessac (FR)

(73) Assignee: SOLVAY SPECIAL CHEM JAPAN, LTD., Anan-shi, Tokushima (JP)

( * ) Notice: Subject to any disclaimer, the term of this patent is extended or adjusted under 35 U.S.C. 154(b) by 0 days.

(21) Appl. No.: 14/790,057

(22) Filed: Jul. 2, 2015

(65) Prior Publication Data
US 2015/0321175 A1  Nov. 12, 2015

Related U.S. Application Data

(63) Continuation of application No. 13/518,735, filed as application No. PCT/JP2010/073306 on Dec. 24, 2010, now abandoned.

(30) Foreign Application Priority Data

Dec. 25, 2009 (JP) ................................ 2009-294338

(51) Int. Cl.
| | |
|---|---|
| *B01J 21/00* | (2006.01) |
| *B01J 23/00* | (2006.01) |
| *B01J 23/10* | (2006.01) |
| *B01J 25/00* | (2006.01) |
| *B01J 29/00* | (2006.01) |
| *B01J 37/08* | (2006.01) |
| *B01D 53/94* | (2006.01) |
| *B01J 23/63* | (2006.01) |
| *B01J 35/10* | (2006.01) |
| *B01J 37/00* | (2006.01) |
| *B01J 37/02* | (2006.01) |
| *B01J 37/03* | (2006.01) |
| *C01F 17/00* | (2006.01) |

(52) U.S. Cl.
CPC ............ *B01J 23/10* (2013.01); *B01D 53/94* (2013.01); *B01J 23/63* (2013.01); *B01J 35/108* (2013.01); *B01J 35/1038* (2013.01); *B01J 35/1042* (2013.01); *B01J 35/1066* (2013.01); *B01J 37/0018* (2013.01); *B01J 37/0205* (2013.01); *B01J 37/031* (2013.01); *B01J 37/035* (2013.01); *B01J 37/088* (2013.01); *C01F 17/0018* (2013.01); *C01F 17/0025* (2013.01); *C01F 17/0043* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/30* (2013.01); *B01D 2255/9202* (2013.01); *B01D 2257/404* (2013.01); *B01D 2257/502* (2013.01); *B01D 2257/702* (2013.01); *C01P 2006/14* (2013.01); *C01P 2006/16* (2013.01)

(58) Field of Classification Search
USPC .......................................... 502/304, 100, 300
See application file for complete search history.

(56) References Cited

U.S. PATENT DOCUMENTS

| | | | |
|---|---|---|---|
| 4,940,685 A | 7/1990 | Sauvion et al. | |
| 5,529,969 A | 6/1996 | Bonneau et al. | |
| 5,945,370 A * | 8/1999 | Yokoi ...................... | B01J 20/06 423/263 |
| 8,460,626 B2 | 6/2013 | Larcher et al. | |
| 2003/0224931 A1 * | 12/2003 | Yamamoto ............. | C01G 25/00 502/304 |
| 2004/0101453 A1 | 5/2004 | Fujiwara | |
| 2009/0220398 A1 | 9/2009 | Verdier et al. | |

(Continued)

FOREIGN PATENT DOCUMENTS

| | | |
|---|---|---|
| CN | 1750866 A | 3/2006 |
| CN | 1817447 A | 8/2006 |
| EP | 0444470 A1 | 9/1991 |

(Continued)

OTHER PUBLICATIONS

A. Corma et al., "Synethesis and catalytic properties of thermally and hydrothermally stable, high-surface-area SiO2—CeO2 mesostructured composite materials and their application for the removal of sulfur compounds from gasoline", Journal of Catalysis, 2004, pp. 441-448, vol. 224.

(Continued)

*Primary Examiner* — James McDonough
(74) *Attorney, Agent, or Firm* — Sughrue Mion, PLLC

(57) ABSTRACT

Disclosed are a composite oxide which is capable of maintaining a large volume of pores even used in a high temperature environment, and which has excellent heat resistance and catalytic activity, as well as a method for producing the composite oxide and a catalyst for exhaust gas purification employing the composite oxide. The composite oxide contains cerium and at least one element selected from aluminum, silicon, or rare earth metals other than cerium and including yttrium, at a mass ratio of 85:15 to 99:1 in terms oxides, and has a property of exhibiting a not less than 0.30 cm$^3$/g, preferably not less than 0.40 cm$^3$/g volume of pores with a diameter of not larger than 200 nm, after calcination at 900° C. for 5 hours, and is suitable for a co-catalyst in a catalyst for vehicle exhaust gas purification.

2 Claims, No Drawings

(56) References Cited

U.S. PATENT DOCUMENTS

2010/0040523 A1    2/2010  Larcher et al.
2012/0302438 A1   11/2012  Ohtake et al.

FOREIGN PATENT DOCUMENTS

| EP | 1 206 965 A1 | 5/2002 |
|---|---|---|
| EP | 2 505 263 A1 | 10/2012 |
| JP | 62-056322 A | 3/1987 |
| JP | 4-214026 A | 8/1992 |
| JP | 5-270824 A | 10/1993 |
| JP | 2004-002148 A | 1/2004 |
| JP | 2008-150237 A | 7/2008 |
| JP | 2009-530091 A | 8/2009 |
| RU | 2 199 389 C1 | 2/2003 |
| WO | 2007/107546 A1 | 9/2007 |
| WO | 2007/131901 A1 | 11/2007 |
| WO | 2008-156219 A1 | 12/2008 |

OTHER PUBLICATIONS

International Searching Authority, International Search Report of PCT/JP2010/073306 dated Mar. 1, 2011.
Russian Patent Office, Decision on Grant, dated May 5, 2015, issued in counterpart Russian Patent Application No. 2012131748/05(050056).
European Patent Office, Communication dated Jan. 22, 2016, issued in counterpart European Application No. 10839545.0.

* cited by examiner

COMPLEX OXIDE, METHOD FOR PRODUCING SAME, AND EXHAUST GAS PURIFYING CATALYST

CROSS REFERENCE TO RELATED APPLICATIONS

This application is a Continuation of U.S. application Ser. No. 13/518,735, filed on Aug. 3, 2012, which is a National Stage of International Application No. PCT/JP2010/073306 filed on Dec. 24, 2010, which claims priority from Japanese Patent Application No. 2009-294338, filed on Dec. 25, 2009, the contents of all of which are incorporated herein by reference in their entirety.

FIELD OF ART

The present invention relates to a composite oxide which may be used as a catalyst, functional ceramics, solid electrolyte for fuel cells, abrasive, and the like, particularly suitably used as a co-catalyst material in catalysts for purifying vehicle exhaust gas and the like, and which has a large pore volume, causing excellent catalytic performance, as well as to a method for producing the composite oxide and a catalyst for exhaust gas purification employing the composite oxide.

BACKGROUND ART

Catalysts for purifying vehicle exhaust gas and the like are composed of a catalytic metal such as platinum, palladium, or rhodium, and a co-catalyst for enhancing the catalyst action of such metal, both supported on a catalyst support made of, for example, alumina or cordierite. The co-catalyst material absorbs oxygen under the oxidizing atmosphere and desorbs oxygen under the reducing atmosphere, and functions to optimally maintain the air/fuel ratio so that the catalyst for exhaust gas purification can efficiently purify noxious components in exhaust gases, such as hydrocarbons, carbon monoxide, and nitrogen oxides.

Efficiency of a catalyst for purifying exhaust gas is generally proportional to the contact area between the active species of the catalytic metal and exhaust gas. It is also important to maintain the air/fuel ratio at optimum, for which the pore volume of a co-catalyst should be made larger to maintain oxygen absorbing and desorbing capability at a high level. However, a co-catalyst, such as cerium-containing oxides, is apt to be sintered during use at high temperatures, e.g., for exhaust gas purification. This results in reduction of its pore volume, causing aggregation of the catalytic metals and decrease in the contact area between exhaust gas and the catalytic metals, which leads to reduction of efficiency in purifying exhaust gases.

In the light of the above, for improving the heat resistance of cerium oxide, Patent Publication 1 proposes a method of producing a cerium composite oxide containing cerium and other rare earth metal elements. The method includes the steps of: forming a liquid medium containing a cerium compound; heating the medium at a temperature of at least 100° C.; separating the precipitate obtained at the end of the preceding step from the liquid medium; adding thereto a solution of a compound of rare earth other than cerium to form another liquid medium; heating the medium thus obtained at a temperature of at least 100° C.; bringing the reaction medium obtained at the end of the preceding heating step to a basic pH to obtain a precipitate; and separating and calcining the precipitate.

The composite oxide obtained by this method is described to have a porosity of at least 0.2 cm$^3$/g provided by pores having a diameter of at most 200 nm, after calcining at 1000° C. for 5 hours.

However, the largest porosity provided by pores having a diameter of at most 200 nm of the composite oxides disclosed in the specific examples in Patent Publication 1, is 0.24 cm$^3$/g after calcining at 1000° C. for 5 hours, and the porosity of this composite oxide after calcining at 900° C. for 5 hours is 0.25 cm$^3$/g provided by pores having a diameter of at most 200 nm. Thus further improvement is demanded.

Patent Publication 2 proposes, for the improvement of thermal stability of cerium oxide (ceria), a composition containing ceria and from about 5 to 25 mole % based on the moles of ceria of a ceria stabilizer selected from the group consisting of La, Nd, Y, and mixtures thereof. This composition is described to be prepared by mixing a ceria precursor with from 5 to 25 mole % of a ceria stabilizer selected from the group consisting of La, Nd, Y and mixtures thereof; forming an intimate mixture of the ceria precursor and the ceria stabilizer by either evaporation of the mixture of the preceding step or precipitation of the mixture of the preceding step as a hydroxide or a carbonate; and calcining the resulting intimate mixture.

However, as a property of the resulting composition, stabilized ceria, Patent Publication 2 is silent about the volume of pores with a diameter of not larger than 200 nm after calcination at 900° C. for 5 hours. Besides, the method disclosed in this publication does not provide a composite oxide having a larger volume of pores with a diameter of not larger than 200 nm after calcination at 900° C. for 5 hours, than the composite oxide taught in Patent Publication 1.

PRIOR ART PUBLICATIONS

Patent Publications

Patent Publication 1: WO-2008-156219-A
Patent Publication 2: JP-4-214026-A

SUMMARY OF THE INVENTION

It is an object of the present invention to provide a composite oxide which is capable of maintaining a large pore volume even in use in a high temperature environment, which brings about excellent heat resistance and catalytic activity, and which is particularly suitable for a co-catalyst for a catalyst for exhaust gas purification, as well as a catalyst for exhaust gas purification utilizing the composite oxide.

It is another object of the present invention to provide a method for producing a composite oxide which realizes easy production of the composite oxide of the present invention capable of maintaining a large pore volume even in use in a high temperature environment.

According to the present invention, there is provided a composite oxide comprising cerium and at least one element selected from aluminum, silicon, or rare earth metals other than cerium and including yttrium, at a mass ratio of 85:15 to 99:1 in terms of oxides, and having a property of exhibiting a not less than 0.30 cm$^3$/g volume of pores with a diameter of not larger than 200 nm, after calcination at 900° C. for 5 hours.

According to the present invention, there is also provided a method for producing a composite oxide comprising the steps of:

(a) providing a cerium solution not less than 90 mol % of which cerium ions are tetravalent, (b) heating and maintaining said cerium solution obtained from step (a) up to and at not lower than 60° C., (c) adding an oxide precursor of at least one element selected from aluminum, silicon, or rare earth metals other than cerium and including yttrium, to a cerium suspension obtained through said heating and maintaining, (d) heating and maintaining said cerium suspension containing said oxide precursor up to and at not lower than 100° C., (e) neutralizing said suspension obtained from step (d), (f) adding a surfactant to said suspension neutralized in step (e) to obtain a precipitate, and (g) calcining said precipitate.

According to the present invention, there is further provided a catalyst for exhaust gas purification comprising the composite oxide of the present invention.

The composite oxide according to the present invention contains at least one element selected from aluminum, silicon, or rare earth metals other than cerium and including yttrium (sometimes referred to as the particular rare earth metals hereinbelow) at the particular ratio, and is capable of maintaining a large pore volume even in use in a high temperature environment. Thus the composite oxide according to the present invention, when used as a co-catalyst in a catalyst for exhaust gas purification, provides particularly effective purification of exhaust gas.

The method for producing a composite oxide according to the present invention includes the steps (a) to (g), in particular, step (f) of adding a surfactant after step (e), so that the composite oxide according to the present invention may be obtained conveniently.

EMBODIMENTS OF THE INVENTION

The present invention will now be explained in detail.

The composite oxide according to the present invention has a property of exhibiting a not less than 0.30 $cm^3/g$ volume of pores, preferably a not less than 0.40 $cm^3/g$ volume of pores, more preferably a not less than 0.50 $cm^3/g$ volume of pores, with a diameter of not larger than 200 nm after calcination at 900° C. for 5 hours. In particular, the composite oxide of the present invention, when containing at least silicon as the at least one element selected from aluminum, silicon, or rare earth metals other than cerium and including yttrium as will be discussed later, has a property of exhibiting preferably a not less than 0.60 $cm^3/g$ volume of pores with a diameter of not larger than 200 nm after calcination at 900° C. for 5 hours.

The composite oxide of the present invention has a property of exhibiting usually a not less than 0.32 $cm^3/g$ volume of pores, preferably a not less than 0.42 $cm^3/g$ volume of pores, more preferably a not less than 0.52 $cm^3/g$ volume of pores, with a diameter of not larger than 200 nm after calcination at 800° C. for 5 hours. The upper limit of the volume of pores with a diameter of not larger than 200 nm after calcination at 900° C. or 800° C. for 5 hours, is not particularly limited, and may be about 0.80 $cm^3/g$. With a less than 0.30 $cm^3/g$ volume of pores, excellent catalytic function may not be brought about when the composite oxide is used in a catalyst for exhaust gas purification.

As used herein, the volume of pores is a value obtained by measuring a volume of pores with a diameter of not larger than 200 nm by means of mercury porosimetry.

The composite oxide according to the present invention has the above-mentioned property, and contains cerium and at least one element selected from aluminum, silicon, or the particular rare earth metals, at amass ratio of 85:15 to 99:1, preferably 85:15 to 95:5, in terms of oxides. If the oxide of cerium and at least one element selected from aluminum, silicon, or the particular rare earth metals, has a cerium content of less than 85 mass % or more than 99 mass % in terms of $CeO_2$, excellent catalytic function may not be brought about.

The particular rare earth metals may preferably be yttrium, lanthanum, praseodymium, neodymium, samarium, europium, gadolinium, terbium, dysprosium, holmium, erbium, thulium, ytterbium, lutetium, or a mixture of two or more of these, with yttrium, lanthanum, praseodymium, neodymium, or a mixture of two or more of these being particularly preferred.

In the present invention, yttrium is expressed in terms of $Y_2O_3$, lanthanum in terms of $La_2O_3$, cerium in terms of $CeO_2$, praseodymium in terms of $Pr_6O_{11}$, neodymium in terms of $Nd_2O_3$, samarium in terms of $Sm_2O_3$, europium in terms of $Eu_2O_3$, gadolinium in terms of $Gd_2O_3$, terbium in terms of $Tb_4O_7$, dysprosium in terms of $Dy_2O_3$, holmium in terms of $Ho_2O_3$, erbium in terms of $Er_2O_3$, thulium in terms of $Tm_2O_3$, ytterbium in terms of $Yb_2O_3$, lutetium in terms of $Lu_2O_3$, aluminum in terms of $Al_2O_3$, and silicon in terms of $SiO_2$.

The production method according to the present invention realizes easy production of the composite oxide of the present invention with good reproducibility, and includes step (a) of providing a cerium solution not less than 90 mol % of which cerium ions are tetravalent.

The cerium solution used in step (a) may be, for example, a ceric nitrate solution or ammonium ceric nitrate, with the ceric nitrate solution being particularly preferred.

In step (a), the initial concentration of the cerium solution not less than 90 mol % of which cerium ions are tetravalent, may be adjusted to usually 5 to 100 g/L cerium, preferably 5 to 80 g/L, more preferably 10 to 70 g/L in terms of $CeO_2$. Usually water is used for the adjustment of the concentration of the cerium solution, and deionized water is particularly preferred. If the initial concentration is too high, the crystallinity of the precipitate to be discussed later is not sufficiently high, and sufficient volume of pores cannot be formed for holding the oxide precursor of at least one element selected from aluminum, silicon, or the particular rare earth metals to be discussed later, resulting in an insufficient volume of pores of the ultimate composite oxide for exhibiting the desired property. Too low an initial concentration leads to low productivity, which is not industrially advantageous.

In the present production method, next step (b) of heating and maintaining the cerium solution obtained from step (a) up to and at not lower than 60° C. is carried out to cause reaction of the cerium solution. By way of step (b) of heating and maintaining, cerium oxide hydrate is generated from the cerium solution to form a cerium suspension. A reactor to be used in step (b) may either be a sealed- or open-type vessel. An autoclave reactor may preferably be used.

In step (b), the temperature at which the cerium solution is heated and maintained is not lower than 60° C., preferably 60 to 200° C., more preferably 80 to 180° C., most preferably 90 to 160° C. The duration of heating and maintaining is usually 10 minutes to 48 hours, preferably 30 minutes to 36 hours, more preferably 1 hour to 24 hours. With insufficient heating and maintaining, the crystallinity of the precipitate to be discussed later is not sufficiently high, and a sufficient volume of pores cannot be formed for holding the oxide precursor of at least one element selected from aluminum, silicon, or the particular rare earth metals to be discussed later, resulting in an insufficient volume of pores of the ultimate composite oxide for exhibiting the desired property. Too long a period of heating and maintaining is not industrially advantageous.

The present method further includes step (c) of adding an oxide precursor of at least one element selected from aluminum, silicon, or rare earth metals other than cerium and including yttrium, to a cerium suspension obtained through said step (b) of heating and maintaining.

The oxide precursor may be any compound which may be converted to an oxide of at least one element selected from aluminum, silicon, or the particular rare earth metals, through an oxidation treatment, such as calcining, and may be, for example, a nitric acid solution of at least one of the particular rare earth metals, aluminum nitrate, colloidal silica, siliconate, or quaternary ammonium silicate sol.

The amount of the precursor to be added may be adjusted so that the ratio of cerium in the cerium suspension to at least one element selected from aluminum, silicon, or the particular rare earth metals, is usually 85:15 to 99:1, preferably 85:15 to 95:5, by mass in terms of oxides. If the oxide of cerium and at least one element selected from aluminum, silicon, or the particular rare earth metals, has a cerium content of less than 85 mass % or more than 99 mass % in terms of $CeO_2$, the resulting composite oxide may not have a volume of pores for exhibiting the desired property.

Step (c) may be carried out after the cerium suspension obtained through the heating and maintaining in step (b) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably about a room temperature of 20 to 30° C.

In step (c), before adding the precursor, the salt concentration of the cerium suspension may be adjusted by removing the mother liquor from the cerium suspension or by adding water. The removal of the mother liquor may be effected, for example, by decantation, Nutsche method, centrifugation, or filter-pressing. In this case, a slight amount of cerium is removed with the mother liquor, so the amounts of the precursor and water to be added next may be adjusted, taking this removed amount of cerium into consideration.

The present method includes step (d) of heating and maintaining the cerium suspension containing the precursor up to and at not lower than 100° C., preferably 100 to 200° C., more preferably 100 to 150° C.

In step (d), the duration of the heating and maintaining may be usually 10 minutes to 6 hours, preferably 20 minutes to 5 hours, more preferably 30 minutes to 4 hours.

In step (d) of heating and maintaining, at lower than 100° C., the crystallinity of the precipitate to be discussed later is not sufficiently high, resulting in an insufficient volume of pores of the ultimate composite oxide for exhibiting the desired property. Too long a period of heating and maintaining is not industrially advantageous.

The present method includes step (e) of neutralizing the suspension obtained from step (d). By this neutralization in step (e), cerium oxide hydrate containing the precursor is generated in the suspension.

The neutralization in step (e) may be effected by adding a base, for example, sodium hydroxide, potassium hydroxide, aqueous ammonia, ammonia gas, or a mixture thereof, with aqueous ammonia being particularly preferred.

The neutralization may be carried out by adding a base to the suspension obtained from step (d) under stirring, or in case of ammonia gas, by bubbling the suspension with ammonia gas in a reactor under stirring. Usually, the neutralization may be carried out so as to generate a precipitate in the suspension at about pH 7 to 9, preferably pH 7 to 8.5.

Step (e) may be carried out after the cerium suspension obtained through the heating and maintaining in step (d) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably about a room temperature of 20 to 30° C.

The present method includes step (f) of adding a surfactant to the suspension neutralized in step (e) to obtain a precipitate.

The surfactant used in step (f) may be, for example, an anionic surfactant, such as ethoxycarboxylate, a nonionic surfactant, such as alcohol ethoxylate, polyethylene glycol, carboxylic acid, or a mixture thereof, with carboxylic acid being particularly preferred.

The carboxylic acid may preferably be a saturated carboxylic acid, such as decanoic, lauric, myristic, or palmitic acid, with lauric acid being particularly preferred.

The amount of the surfactant to be added in step (f) is usually 5 to 50 parts by mass, preferably 7 to 40 parts by mass, more preferably 10 to 30 parts by mass, based on 100 parts by mass of the total of cerium, aluminum, silicon, and the particular rare earth metals in the suspension neutralized in step (e) in terms of oxides. With the amount smaller than the above range, the pore volume of the ultimate composite oxide may not be sufficient for exhibiting the desired property. The amount exceeding the above range will impact the pore volume little, and is not industrially advantageous.

The surfactant to be used in step (f), if in a solid form, may be dissolved in water or aqueous ammonia to be used as a surfactant solution. Here, the concentration of the surfactant is not particularly limited as long as the solution is stable, and may usually be 10 g/L to 500 g/L, preferably about 50 to 300 g/L, for workability and efficiency.

In step (f), it is preferred to have a retention time after adding the surfactant, in order to cause the cerium oxide hydrate containing the precursor present in the suspension, which has been neutralized in step (e), to uniformly adsorb the surfactant on its surface. The retention time may usually be 10 minutes to 6 hours, preferably 20 minutes to 5 hours, more preferably 30 minutes to 4 hours. The retention may preferably be carried out while the precipitate is stirred.

If step (f) of adding the surfactant is performed, for example, after step (c) and before step (d), or after step (d) and before step (e), the effect of the addition cannot be achieved, and the pore volume of the ultimate composite oxide is insufficient for exhibiting the desired property. Thus step (f) must be carried out after step (e).

Through step (f), a slurry of the precipitate of cerium oxide hydrate containing the precursor may be obtained, which is highly crystalline and on which particle surface the surfactant has uniformly been adsorbed. The precipitate may be separated by, for example, Nutsche method, centrifugation, or filter-pressing. The precipitate may optionally be washed with water as necessary. For improving efficiency in the subsequent step (g), the precipitate may optionally be dried as appropriate. Such drying may be carried out at about 60 to 200° C.

The present method includes step (g) of calcining the precipitate thus obtained. The temperature for the calcining is usually 250 to 700° C., preferably 300 to 600° C.

The duration of the calcination in step (g) may suitably be determined in view of the calcination temperature, and may usually be 1 to 10 hours.

The composite oxide powder obtained by the method of the present invention may be made into a desired particle size by pulverization. For example, for use as a co-catalyst in a catalyst for exhaust gas purification, the composite oxide powder preferably has an average particle size of 1 to 50 μm.

The catalyst for exhaust gas purification according to the present invention is not particularly limited as long as it incorporates a co-catalyst containing the composite oxide of the present invention, and the method of production thereof and other materials to be used may be, for example, conventional.

EXAMPLES

The present invention will now be explained in more detail with reference to Examples and Comparative Examples, which are not intended to limit the present invention.

Example 1

This example relates to a composite oxide of cerium oxide and lanthanum oxide at a mass ratio of 90:10.

50 g of a ceric nitrate solution in terms of $CeO_2$ containing not less than 90 mol % tetravalent cerium ions was measured out, and adjusted to a total amount of 1 L with pure water. The obtained solution was heated to 100° C., maintained at this temperature for 30 minutes, and allowed to cool down to the room temperature, to thereby obtain a cerium suspension.

After the mother liquor was removed from the cerium suspension thus obtained, 20.8 ml of a lanthanum nitrate solution (5.2 g in terms of $La_2O_3$) was added, and the total volume was adjusted to 1 L with pure water.

Then the cerium suspension containing a precursor of lanthanum oxide was maintained at 120° C. for 2 hours, allowed to cool, and neutralized to pH 8.5 with aqueous ammonia.

To a slurry resulting from the neutralization, an ammonium laurate solution prepared by dissolving 10.4 g of lauric acid in 1.2% aqueous ammonia was added, and stirred for 30 minutes. The obtained slurry was subjected to solid-liquid separation through a Nutsche filter to obtain a filter cake. The cake was calcined in the air at 300° C. for 10 hours to obtain composite oxide powder mainly composed of cerium oxide with 10% by mass of lanthanum oxide.

For determination of its properties, the obtained composite oxide powder was calcined in the air at 800° C. for 5 hours or at 900° C. for 5 hours, and then subjected to measurement of the volume of pores with a diameter of not larger than 200 nm, by means of mercury porosimetry. The results are shown in Table 1.

Example 2

This example relates to a composite oxide of cerium oxide and lanthanum oxide at a mass ratio of 85:15.

Composite oxide powder mainly composed of cerium oxide with 15% by mass of lanthanum oxide was prepared in the same way as in Example 1, except that the amount of the lanthanum nitrate solution was 33.2 ml (8.3 g in terms of $La_2O_3$). The properties of the composite oxide powder thus obtained were evaluated in the same way as in Example 1. The results are shown in Table 1.

Example 3

This example relates to a composite oxide of cerium oxide and praseodymium oxide at a mass ratio of 90:10.

Composite oxide powder mainly composed of cerium oxide with 10% by mass of praseodymium oxide was prepared in the same way as in Example 1, except that the lanthanum nitrate solution was replaced with 20.5 ml of a praseodymium nitrate solution (5.2 g in terms of $Pr_6O_{11}$). The properties of the composite oxide powder thus obtained were evaluated in the same way as in Example 1. The results are shown in Table 1.

Example 4

This example relates to a composite oxide of cerium oxide, lanthanum oxide, and praseodymium oxide at a mass ratio of 90:5:5.

Composite oxide powder mainly composed of cerium oxide with 5% by mass each of lanthanum oxide and praseodymium oxide was prepared in the same way as in Example 1, except that the amount of the lanthanum nitrate solution was 10.4 ml (2.6 g in terms of $La_2O_3$), and 10.3 ml of a praseodymium nitrate solution (2.6 g in terms of $Pr_6O_{11}$) was added at the same time. The properties of the composite oxide powder thus obtained were evaluated in the same way as in Example 1. The results are shown in Table 1.

Example 5

This example relates to a composite oxide of cerium oxide and neodymium oxide at a mass ratio of 90:10.

Composite oxide powder mainly composed of cerium oxide with 10% by mass of neodymium oxide was prepared in the same way as in Example 1, except that the lanthanum nitrate solution was replaced with 23.5 ml of a neodymium nitrate solution (5.2 g in terms of $Nd_2O_3$). For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Example 6

This example relates to a composite oxide of cerium oxide and yttrium oxide at a mass ratio of 90:10.

Composite oxide powder mainly composed of cerium oxide with 10% by mass of yttrium oxide was prepared in the same way as in Example 1, except that the lanthanum nitrate solution was replaced with 22.9 ml of a yttrium nitrate solution (5.2 g in terms of $Y_2O_3$). For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Example 7

This example relates to a composite oxide of cerium oxide and aluminum oxide at a mass ratio of 90:10.

Composite oxide powder mainly composed of cerium oxide with 10% by mass of aluminum oxide was prepared in the same way as in Example 1, except that the lanthanum nitrate solution was replaced with 38.2 g of aluminum nitrate nonahydrate (5.2 g in terms of $Al_2O_3$). For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Example 8

This example relates to a composite oxide of cerium oxide, lanthanum oxide, praseodymium oxide, and aluminum oxide at a mass ratio of 85:5:5:5.

Composite oxide powder mainly composed of cerium oxide with 5% by mass each of lanthanum oxide, praseodymium oxide, and aluminum oxide was prepared in the same way as in Example 1, except that the amount of the lanthanum nitrate solution was 11.2 ml (2.8 g in terms of $La_2O_3$), and 11.1 ml of a praseodymium nitrate solution (2.8 g in terms of $Pr_6O_{11}$) and 20.6 g of aluminum nitrate nonahydrate (2.8 g in terms of $Al_2O_3$) were added at the same time. For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Example 9

This example relates to a composite oxide of cerium oxide and silicon oxide at a mass ratio of 90:10.

Composite oxide powder mainly composed of cerium oxide with 10% by mass of silicon oxide was prepared in the same way as in Example 1, except that the lanthanum nitrate solution was replaced with 25.4 g of colloidal silica (5.2 g in terms of $SiO_2$). For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Example 10

This example relates to a composite oxide of cerium oxide, lanthanum oxide, praseodymium oxide, and silicon oxide at a mass ratio of 85:5:5:5.

Composite oxide powder mainly composed of cerium oxide with 5% by mass each of lanthanum oxide, praseodymium oxide, and silicon oxide was prepared in the same way as in Example 1, except that the amount of the lanthanum nitrate solution was 11.2 ml (2.8 g in terms of $La_2O_3$), and 11.1 ml of praseodymium nitrate solution (2.8 g in terms of $Pr_6O_{11}$) and 13.7 g of colloidal silica (2.8 g in terms of $SiO_2$) were added at the same time. For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Comparative Examples 1 to 4

Various composite oxide powders were prepared in the same way as in Examples 1 to 4, except that the treatment with the ammonium laurate solution was eliminated. That is, these composite oxides were prepared by the production method disclosed in Patent Publication 1. The properties of the composite oxide powders thus obtained were evaluated in the same way as in Example 1. The results are shown in Table 1.

Comparative Example 5

Composite oxide powder mainly composed of cerium oxide with 10% by mass of lanthanum oxide was prepared in the same way as in Example 1, except that the ammonium laurate solution was added immediately after the addition of the lanthanum nitrate solution. For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

Comparative Example 6

Composite oxide powder mainly composed of cerium oxide with 10% by mass of lanthanum oxide was prepared in the same way as in Example 1, except that the ammonium laurate solution was added immediately before the neutralization with aqueous ammonia. For determination of its properties, the composite oxide powder thus obtained was subjected to the evaluation of the volume of pores with a diameter of not larger than 200 nm after calcination at 900° C. for 5 hours in the same way as in Example 1. The results are shown in Table 1.

TABLE 1

| | Composition of Ce + ME in terms of oxides (mass %) | Volume of pores ($cm^3/g$) (≤200 nm) | |
|---|---|---|---|
| | | 800° C./5 h | 900° C./5 h |
| Example 1 | Ce/La = 90/10 | 0.64 | 0.53 |
| Example 2 | Ce/La = 85/15 | 0.36 | 0.32 |
| Example 3 | Ce/Pr = 90/10 | 0.41 | 0.36 |
| Example 4 | Ce/La/Pr = 90/5/5 | 0.50 | 0.44 |
| Example 5 | Ce/Nd = 90/10 | — | 0.33 |
| Example 6 | Ce/Y = 90/10 | — | 0.31 |
| Example 7 | Ce/Al = 90/10 | — | 0.38 |
| Example 8 | Ce/La/Pr/Al = 85/5/5/5 | — | 0.35 |
| Example 9 | Ce/Si = 90/10 | — | 0.68 |
| Example 10 | Ce/La/Pr/Si = 85/5/5/5 | — | 0.70 |
| Comp. Ex. 1 | Ce/La = 90/10 | 0.22 | 0.21 |
| Comp. Ex. 2 | Ce/La = 85/15 | 0.21 | 0.22 |
| Comp. Ex. 3 | Ce/Pr = 90/10 | 0.23 | 0.23 |
| Comp. Ex. 4 | Ce/La/Pr = 90/5/5 | 0.26 | 0.25 |
| Comp. Ex. 5 | Ce/La = 90/10 | — | 0.15 |
| Comp. Ex. 6 | Ce/La = 90/10 | — | 0.21 |

ME stands for one or more elements selected from aluminum, silicon, and rare earth metals other than cerium and including yttrium.

As clearly seen from the results in Table 1, the composite oxides of Examples prepared by the method of the present invention exhibited larger volumes of pores compared to the composite oxides of Comparative Examples 1 to 4 prepared by the method disclosed in Patent Publication 1, after calcination under the same conditions. It is assumed that, in Comparative Examples 1 to 4, during the course of calcining the filter cake to obtain a composite oxide, evaporation of moisture present at the interface of the particles in the precipitate induced aggregation of the particles, and sufficient volume of pores could not be achieved. In contrast, in the composite oxides of Examples prepared by the method of the present invention, the surfactant was adsorbed uniformly on the surface of the particles in the precipitate to hydrophobize the particle surface, which prevented aggregation of the particles caused by the moisture evaporation during calcining. As a result, the composite oxides of Examples were able to maintain, even after the calcination at high temperature, large volumes of pores which cannot be achieved by the composite oxides disclosed in Patent Publication 1.

What is claimed is:

1. A method for producing a composite oxide having a property of exhibiting a not less than 0.30 cm$^3$/g volume of pores with a diameter of not larger than 200 nm after calcination at 900° C. for 5 hours, said method comprising the steps of:
    (a) providing a cerium solution not less than 90 mol % of which cerium ions are tetravalent,
    (b) heating and maintaining said cerium solution obtained from step (a) up to and at not lower than 60° C.,
    (c) adding an oxide precursor of at least one element selected from aluminum, silicon, or rare earth metals other than cerium and including yttrium, to a cerium suspension obtained through said heating and maintaining,
    (d) heating and maintaining said cerium suspension containing said oxide precursor of at least one element selected from aluminum, silicon, or rare earth metals other than cerium and including yttrium, up to and at not lower than 100° C.,
    (e) neutralizing said suspension obtained from step (d),
    (f) adding a surfactant to said suspension neutralized in step (e), followed by a retention time of 10 minutes to 6 hours to obtain a precipitate, without subjecting said suspension to washing between step (e) and step (f), and
    (g) calcining said precipitate,
    to thereby obtain a composite oxide having a property of exhibiting a not less than 0.30 cm$^3$/g volume of pores with a diameter of not larger than 200 nm after calcination at 900° C. for 5 hours.

2. The method according to claim 1, wherein a cerium content of said cerium solution in step (a) is 5 to 80 g/L in terms of CeO$_2$.

* * * * *